United States Patent [19]

Altrichter

[11] Patent Number: 5,021,144
[45] Date of Patent: Jun. 4, 1991

[54] PROCESS FOR THE REDUCTION OF $NO_X$ IN AN FCC REGENERATION SYSTEM BY SELECT CONTROL OF CO OXIDATION PROMOTER IN THE REGENERATION ZONE

[75] Inventor: Diana M. Altrichter, Concord, Calif.

[73] Assignee: Shell Oil Company, Houston, Tex.

[21] Appl. No.: 317,233

[22] Filed: Feb. 28, 1989

[51] Int. Cl.⁵ .......................................... C10G 11/18
[52] U.S. Cl. ................... 208/113; 208/124; 208/149; 502/41; 502/43; 423/239; 423/247
[58] Field of Search ............... 208/113, 120, 121, 149, 208/124; 502/41, 42, 43; 423/235, 237, 239, 247, 245.3

[56] References Cited

U.S. PATENT DOCUMENTS

| | | | |
|---|---|---|---|
| 3,902,990 | 9/1975 | Luckenbach | 208/164 |
| 3,909,392 | 9/1975 | Horecky et al. | 208/120 |
| 3,958,953 | 5/1976 | Luckenbach | 208/164 |
| 3,966,587 | 6/1976 | Bittensky et al. | 208/164 |
| 4,222,856 | 9/1980 | Hansel et al. | 208/159 |
| 4,235,704 | 11/1980 | Luckenbach | 208/113 |
| 4,290,878 | 9/1981 | Blanton | 208/120 |
| 4,300,997 | 11/1981 | Meguerian et al. | 208/120 |
| 4,304,659 | 12/1981 | Pratt et al. | 208/113 |
| 4,324,688 | 4/1982 | Castagnos et al. | 208/113 |
| 4,350,615 | 9/1982 | Meguerian et al. | 502/66 |
| 4,435,282 | 3/1984 | Bertolacini et al. | 208/113 |
| 4,539,303 | 9/1985 | MacLean et al. | 502/41 |
| 4,744,962 | 5/1988 | Johnson et al. | 208/113 |
| 4,755,282 | 7/1988 | Samish et al. | 208/113 |

Primary Examiner—Anthony McFarlane

[57] ABSTRACT

A process is disclosed wherein a regenerator is operated in an incomplete mode of combustion to regenerate FCC catalyst to burn coke contained thereon in the presence of a CO oxidation promoter. The quantity of the CO oxidation promoter is regulated so that there is at least two and preferably at least three times the minimum quantity of CO oxidation promoter present than necessary to prevent temperature excursions in the dilute phase caused by afterburn combustion of CO to $CO_2$. The regeneration zone is maintained in an incomplete mode of combustion defined by having a CO content greater than 1.0 percent and preferably from 1 to 10 percent.

19 Claims, 1 Drawing Sheet

EFFECT OF PROMOTER ADDITION RATE ON NOx EMISSIONS AT VARYING CO BOILER OPERATING CONDITIONS 45 lb/DAY PROMOTER ADDITION WITH VARYING BOILER STEAM PRODUCTION:
- ○ 99 - 105 Mlb STEAM/hr
- □ 108 - 116 Mlb STEAM/hr
- △ 124 - 127 Mlb STEAM/hr 15 lb/DAY PROMOTER ADDITION WITH VARYING BOILER STEAM PRODUCTION:
- ⊚ 93 - 104 Mlb STEAM/hr
- ▣ 107 - 112 Mlb STEAM/hr
- ▲ 125 - 133 Mlb STEAM/hr

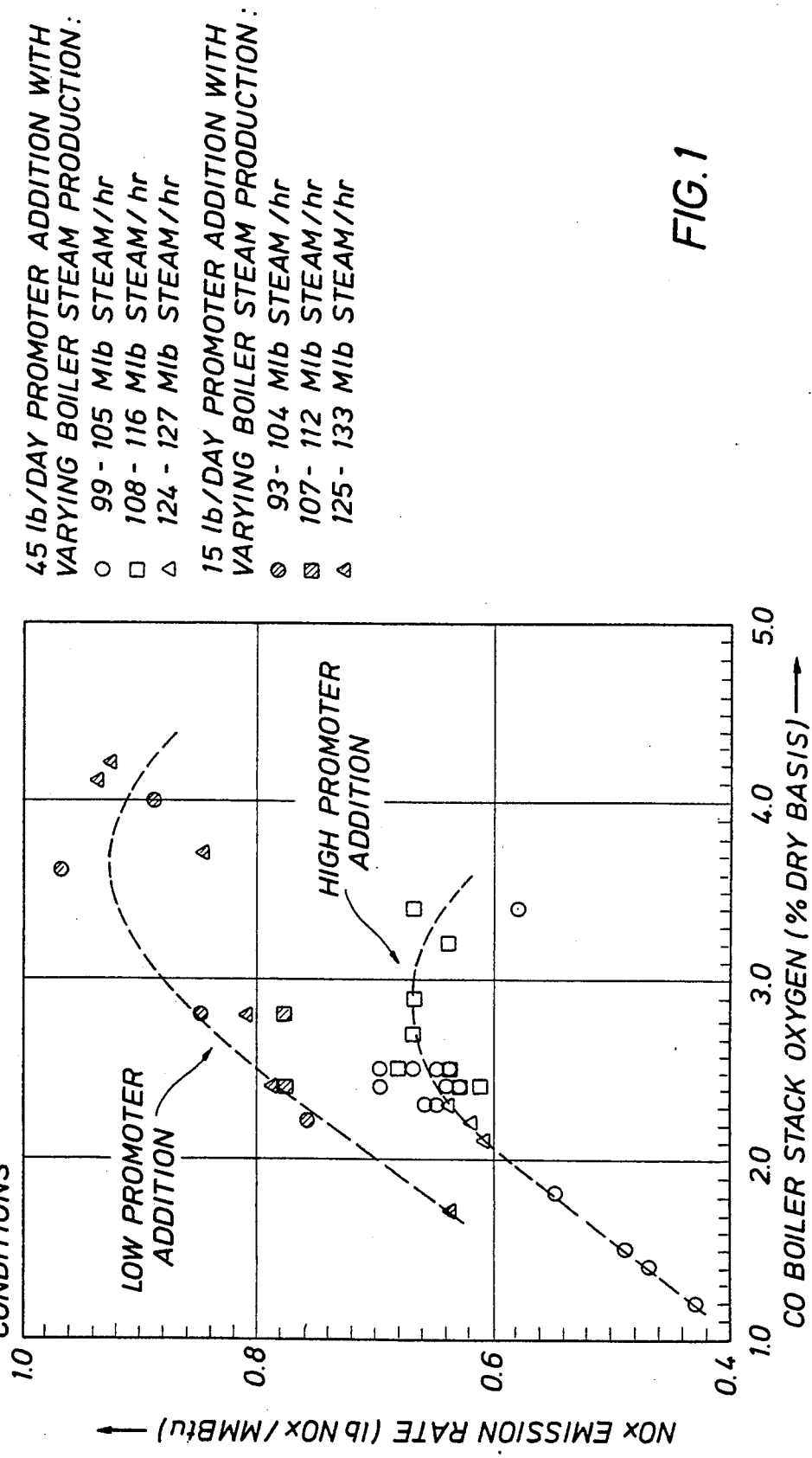

PROCESS FOR THE REDUCTION OF NO$_X$ IN AN FCC REGENERATION SYSTEM BY SELECT CONTROL OF CO OXIDATION PROMOTER IN THE REGENERATION ZONE

FIELD OF INVENTION

This application relates to a fluid catalytic cracking process where nitrogen oxides (NO$_x$) are formed in the flue gas of the regeneration zone in addition to CO. Both of these gases in the regenerator flue gas are passed to a CO boiler (combustion zone) in which CO is combusted to CO$_2$ in the presence of oxygen. Any ammonia (NH$_3$) present in the flue gas can result in production of NO$_x$ in the gas effluent emitted from a CO boiler. It is the object of this invention to mitigate the amount of ammonia produced in the regeneration zone flue gas and thereby the amount of NO$_x$ produced during CO combustion to CO$_2$.

With the advent of modern fluid catalytic cracking (FCC) cracking catalysts such as crystalline aluminosilicate zeolites, it is desirable to reduce the coke content of regenerated FCC catalyst to a very low level, i.e., below 0.2 w %. To ensure complete combustion of the coke on the catalyst to CO and CO$_2$, a CO oxidation combustion promoter is usually distributed in association with the cracking catalyst inventory and passed (recirculated) between the hydrocarbon reaction zone, stripping zone, and regeneration zone. These CO oxidation combustion promoters, such as platinum dispersed on aluminum, have also been incorporated with the FCC cracking catalyst. Use of these CO oxidation promoters results in an increased quantity of CO$_2$ content in the regeneration zone. This invention deals with a regeneration zone, operated in a partial mode of combustion which is defined by a temperature of 1050° F. to 1300° F. and a CO content, by volume, of greater than 1% and preferably from 1% to 10%. The use of CO promoters in a regeneration zone operated in a partial mode of combustion serves to consume the excess oxygen in the regenerator dense bed, thereby preventing "afterburn". This is defined as the combustion and associated temperature excursions which would otherwise occur in the dispersed phase (dilute) of the regenerator.

This invention is concerned with control of ammonia content in an FCC regenerator off-gas (flue gas). Use of this invention is believed a means to provide compliance with strict air pollution standards, especially in California, without resort to an increase in capital expenditure or to the addition of components harmful to the catalyst or the hydrocarbonaceous product derived from an FCC process.

BACKGROUND OF THE INVENTION

New FCC catalyst regeneration techniques call for the regenerator to be operated in a "standard" or complete mode of combustion. Older more established FCC catalyst regeneration systems operate in an incomplete mode of combustion. This invention is concerned with an incomplete mode of combustion in the regenerator. This type of system is defined wherein a relatively large amount of coke is left on the regenerated catalyst which is passed to an FCC regeneration zone from an FCC reaction zone. The content of CO in the regeneration zone is relatively high and usually greater than 1.0% by volume. Usually, the content of CO in these older systems range from 1-10% volume. The concentration of carbon on the regenerated catalyst is approximately 0.05 to 0.45.

In U.S. Pat. No. 4,435,282, Bertolacini et al, a system is devised for substantially complete combustion of coke deposited on an FCC molecular sieve catalyst. In the regenerator, hydrocarbon conversion catalyst particles are associated with particles of a platinum group metal which acts to promote the combustion of CO to CO$_2$. The gaseous effluent derived from a regeneration zone operated in this type of "full combustion mode", (sometimes referred to as standard) has a low CO content and a high CO$_2$ content.

A process for the control of NO$_x$ in the presence of a platinum-promoted complete combustion regenerator is disclosed in U.S. Pat. No. 4,290,878, issued to Blanton. Recognition is made of the fact that in a complete mode of combustion CO oxidation promoters produce an increased content of nitrogen oxide in the flue gas. These nitrogen oxides are reduced by employing a small (but stoichiometric) amount of an iridium or rhodium compound with the cracking catalyst sufficient to convert NO$_x$ to nitrogen and water.

In a similar manner, Luckenbach, U.S. Pat. No. 4,235,704, discloses a system for monitoring the oxides of nitrogen in a flue gas from a regeneration zone and thereafter adjusting the concentration of CO oxidation combustion promoter in the regeneration zone to maintain oxides of nitrogen concentration below a predetermined limit. This system, like Blanton, operates in a complete mode of combustion. It is discussed at column 7 that when the NO$_x$ sensor exceeds a predetermined limit of NO$_x$ in the flue gas, the catalyst added to the system contains a reduced quantity or no quantities of CO oxidation promoter. A disclosure is also made that if the rate of addition of the combustion promoter is not sufficient to adequately reduce NO$_x$ levels, a combustion promoter may be doped with a poison to selectively deactivate the combustion promoter relative to the cracking catalyst.

In U.S. Pat. No. 4,744,968 this inventor participated in an invention to reduce the quantity of ammonia in a regeneration zone (or a regenerator off-gas) by the addition of NO$_x$ either to the regenerator per se or to a flue gas exiting from the regenerator. Another invention directed to the reduction of ammonia in a regenerator was the development of the addition of a noble metal dispersed on an inorganic support wherein the noble metal catalyst possessed a size of from 10 to 40 microns. This was the essence of the invention in U.S. Pat. No. 4,755,282.

These patentees have failed to appreciate a system whereby NO$_x$ is reduced by control of ammonia in an incomplete combustion regenerator via increase in the quantity of combustion promoter in the regeneration zone. In fact, both Luckenbach and Blanton teach that under complete combustion conditions the addition of excess oxidation promoter result in an increase in NO$_x$ content.

OBJECTS AND EMBODIMENTS

It is therefore an object of this invention to provide a process for the reduction of NO$_x$ in a fluid catalytic cracking process by reduction and control of ammonia in the regeneration zone flue gas.

Another object of this invention is to provide for control of NO$_x$ from a fluidized catalytic cracking process by addition to the regenerator of a stoichiometric excess of CO oxidation promoter.

Another object of this invention is to provide a control process for a regeneration off-gas to produce a CO oxidation zone combustion feed stream with a reduced quantity of ammonia. This will result in a decreased quantity of $NO_x$.

Another object of this invention is to provide a continuous process for the reduction of ammonia content in a regeneration zone off-gas by addition of select increased stoichiometric quantities of CO oxidation promoters.

One embodiment of this invention resides in a process for cracking hydrocarbons in a cracking system employing a catalytic cracker, a catalyst regenerator and an inventory of circulating particulate solids including cracking catalyst and CO oxidation promoters, wherein the hydrocarbons are cracked in contact with the cracking catalyst and coke is formed on the cracking catalyst at cracking conditions in the catalytic cracker and wherein the regenerator is operated to regenerate the catalyst having coke thereon in the presence of an added oxygen-containing gas to produce a quantity of CO greater than 1.0% by volume and wherein the CO oxidation promoter is present in a quantity at least three times greater than the stoichiometric amount of oxidation promoter needed to prevent afterburn and the associated temperature excursions in the dilute phase.

Another embodiment of this invention resides in a process for reducing $NO_x$ emission during a process for the cracking of hydrocarbons and catalyst regeneration comprising a cracking catalyst inventory of circulating solid particles including a CO oxidation promoter, where the catalyst inventory and the CO oxidation promoter are recycled between a hydrocarbon cracking zone and a catalyst regeneration zone operated in a partial oxidation combustion mode defined by a temperature of 1050° F. to about 1300° F. and a CO content by volume of greater than 1 percent, wherein regeneration off-gas is formed by burning coke off the catalyst inventory, in the presence of a molecular oxygen-containing gas, at regeneration conditions, in the regeneration zone and where, during the coke-burning, carbon monoxide, carbon dioxide and ammonia ($NH_3$) are formed, the improvement which consists of reducing the presence of ammonia ($NH_3$) by incorporating at least three times the amount by weight of oxidation promoter than necessary to prevent combustion afterburning and the associated temperature excursions which accompany afterburning in the dilute phase of the regenerator.

BRIEF DESCRIPTION OF THE INVENTION

This invention is concerned with the reduction of ammonia ($NH_3$) in an off-gas (flue gas) derived from a fluid catalytic cracking regeneration zone operated in a partial mode of combustion by adding an excess stoichiometric quantity of CO oxidation promoter. The excess quantity should be at least three times the minimum amount of CO oxidation promoter necessary to prevent combustion afterburning and the associated temperature excursions which accompany afterburning in the dilute phase of the regenerator.

DETAILED DESCRIPTION OF THE INVENTION

The present invention is concerned with reduction in $NO_x$ emissions in a fluidized catalytic cracking system which cracks petroleum feedstocks wherein cracking catalyst is regenerated in an incomplete mode of operation in the presence of oxygen in a regeneration zone. Suitable feedstocks useful in this type of cracking process include petroleum distillates of residual or crude oil which, when catalytically cracked, provide either a gasoline or a gas oil product. Synthetic feeds having boiling points of from 400° F. to about 1000° F. may also be included, as exemplified by oils derived from coal or shale oil.

The catalytic cracking of petroleum distillates in an FCC unit results in diminishment of the molecular weight of relatively high molecular weight hydrocarbons to hydrocarbons of relatively low molecular weight. This of course results in the production of lower molecular weight hydrocarbons. The cracking is performed in a catalytic cracking reactor in the presence of an inventory of catalyst particles. This inventory of catalyst particles may be present in physical association with a CO oxidation promoter or the latter may be incorporated to the cracking catalyst per se. In any event, the cracking catalyst and the CO oxidation promoter are circulated between an FCC reactor system, a stripping system (used to remove indigenous hydrocarbons from the surface of the catalyst) and a regeneration zone.

Catalyst suitable in this type of catalytic cracking system include siliceous inorganic oxides, such as silica, alumina, or silicon-containing cracking catalyst including crystalline, aluminosilicate zeolite associated with a porous refractory oxide matrix, such as a clay or the like. Zeolites suitable for these types of systems include an X zeolite or a Y zeolite having a very low sodium content. Cracking catalyst can comprise a silica-alumina mixture. The CO oxidation promoter usually comprises a noble metal dispersed on an alumina support. Specific examples of these promoters include platinum or palladium dispersed on alumina.

After the cracking process, which quickly takes place in a riser reactor unit in the cracking system, it is desirable to separate the hydrocarbon products from the catalyst immediately after cracking. A stripping zone is situated intermediately after the cracking reactor and before the regeneration zone. To cause quick and rapid disengagement of the hydrocarbon products from the catalyst, it is preferred that the stripping zone be equipped with means to inject steam or nitrogen to perform the stripping and is usually maintained at a temperature of 600° F. to 1000° F.

The cracking conditions employed during the conversion of the petroleum distillates include a temperature of 600° F. to about 1000° F., a catalyst-to-hydrocarbon weight ratio of about 3 to 10, and a weight hourly space velocity of about 5 to about 50 per hour for the hydrocarbon conversion. The average amount of coke deposited on the surface of the cracking catalyst is usually between 0.5% w and 2.5% w depending on the composition of the feed materials. Rapid disengagement after cracking is achieved via the above defined stripping zone.

Catalyst passed from the stripping zone to the catalyst regeneration zone undergoes regeneration in the presence of oxygen. The regeneration zone includes a lower dense bed of catalyst having a temperature of about 900° F. to about 1200° F. and a surmounted dilute phase of catalyst having a temperature of from about 700° F. to about 1100° F. In order to remove coke from the catalyst, oxygen is supplied in a stoichiometric or substoichiometric relationship to the coke on the catalyst which is to undergo regeneration. This oxygen is added to the regeneration zone by any suitable means such as a sparging device in the bottom of the regeneration zone. It is also possible to augment this oxygen with additional oxygen added to the dilute phase of the regeneration zone above the dense phase of regenerating catalyst. In this invention the amount of oxygen necessary to add to the regeneration zone should result in a CO production of greater than 1 volume percent and preferably between 1 and 10 volume percent CO.

The regeneration zone operates in a partial or incomplete combustion mode which is defined as having a quantity of carbon monoxide in the regeneration zone at a level of from 1 to 10% by volume. The temperature in the regeneration zone during the partial oxidation combustion mode is between 1050° F. and 1300° F. It is preferred that the quantity of coke on the catalyst be reduced to approximately 0.5% w before the catalyst is returned to the catalytic cracking zone.

In order to diminish the quantity of CO present in the regeneration zone a CO oxidation promoter can be added. The prior art has taught that this CO promoter should be used with care in that $NO_x$ production can result by an increased amount of the CO oxidation promoter when the regenerator is operated in a complete mode of combustion. One of the essentials of this invention comprises the fact that the amount of CO oxidation promoter is maintained in a quantity equal to at least two or at least three times the minimum quantity of CO oxidation promoter necessary to prevent afterburn in the regenerator, when the regenerator is operated in incomplete mode of combustion. As used in this description and in the appended claims the terms "minimum quantity" and "minimum amount" mean the least quantity by weight of CO oxidation promoter necessary to substantially consume the excess oxygen in the regenerator dense bed such that afterburn is substantially prevented. While the following Example shows that at least three times the minimum quantity of promoter functions to decrease $NO_x$, it is reasonably believed that between two to three times the minimum quantity will also function to reduce $NO_x$. This additional CO oxidation promoter results in a reduction in the ammonia generated in the regeneration zone. Use also consumes all of the oxygen in the dense phase leaving very little oxygen and thereby preventing afterburning in the regenerator. This likewise results in a reduction in the amount of ammonia converted to $NO_x$ during the combustion of the flue gas in a CO combustion zone.

In order to eliminate or reduce the amount of CO in the flue gas emitted to the atmosphere, the effluent from the regeneration zone passes to a CO boiler. In the CO boiler, oxygen is added to react with the CO and thereby produce $CO_2$. One advantage of this invention is that $NO_x$ can be reduced in an FCC system operated under a partial or incomplete mode of combustion with existing equipment with only minor alterations to the catalyst inventory.

EXAMPLE

In this example, the addition of CO promoter to a catalytic cracking system was demonstrated to have a large impact upon the amount of ammonia in the regeneration off gas, and consequently, on the amount of $NO_x$ formed in the CO boiler.

In a fluidized catalytic cracking regeneration zone operating in incomplete combustion (1-10% CO), regeneration gas is routed to three parallel CO boilers operated to combust the CO in the regenerator gas and to produce steam. In addition to the regeneration gas, a varying amount of supplemental fuel is fired in the boiler to produce steam in the amount of 90 to 150 Mlb steam/hr from each boiler. Fifteen pounds of a commercial 500 ppm platinum/alumina CO promoter was added to the catalytic cracker on a daily basis to minimize afterburn and associated temperature excursions in the regenerator. Measurements of the ammonia content in the regeneration gas revealed 1900 ppm ammonia. The $NO_x$ content of the CO boiler stack gas was measured over a wide range of CO boiler operating conditions, including a range in steam make of 93 to 133 Mlb steam production per hour and 1 to 5% excess oxygen in the stack of the boiler. Measured $NO_x$ ranged from 0.64 to 0.98 lb $NO_x$/MMBtu total fuel fired in the boiler.

Subsequently, the CO promoter addition rate was increased to 45 lb/day. After allowing the regeneration system to stabilize for three days at the higher promoter addition rate, regeneration gas ammonia content and boiler stack gas $NO_x$ emissions measurements were made over a range of boiler operating conditions (99 to 127 Mlb/hr steam make and 1 to 4% excess oxygen in the boiler stack). The ammonia concentration in the regeneration gas was found to be 1100 ppm, much lower than the 1900 ppm observed at the lower promoter addition rate. The reduced ammonia concentration resulted in $NO_x$ emissions of 0.43 to 0.70 lb $NO_x$/MMBtu over the observed boiler operating range. This corresponded to a 14 to 28% reduction in CO boiler $NO_x$ emissions.

BRIEF DESCRIPTION OF THE DRAWING

FIG. 1 is a graph which shows the effect of promoter addition on $NO_x$ emissions over a wide range of CO boiler load and excess oxygen level.

DETAILED DESCRIPTION OF THE DRAWING

In an operating unit the amount of CO oxidation promoter was varied between a low addition rate (15 lb/day) and a high addition rate (45 lb/day). At each of these promoter addition rates, $NO_x$ emissions from the CO boiler were measured over a wide range of boiler load (93-133 Mlb steam production/hour) and excess oxygen level (1-5%). As shown in FIG. 1, the quantity of $NO_x$ for the low promoter addition was much higher than for the high promoter addition.

What is claimed is:

1. A process for cracking hydrocarbons in a cracking system employing a catalytic cracker, a catalyst regenerator having a dilute phase and an inventory of circulating particulate solids including cracking catalyst and CO oxidation promoters, wherein said hydrocarbons are cracked in contact with said cracking catalyst and coke is formed on said cracking catalyst at cracking conditions in said catalytic cracker and wherein said regenerator is operated to regenerate said catalyst having coke thereon in the presence of an added oxygen-containing gas to produce a quantity of CO greater than 1.0% by volume and wherein said CO oxidation promoter is present in a quantity at least three times greater than the minimum amount of oxidation promoter sufficient to prevent afterburn combustion in the dilute phase of the regenerator.

2. The process of claim 1 wherein said carbon monoxide promoter comprises a metal selected from platinum and palladium dispersed on an inorganic oxide support.

3. The process of claim 2 wherein said platinum or palladium is present in the promoter in an amount equal to 0.1 ppm to 1% by weight.

4. The process of claim 1 wherein said cracking catalyst comprises a silica-alumina catalyst or a zeolite-containing catalyst.

5. The process of claim 4 wherein said zeolite-containing catalyst is selected from the group consisting of an X zeolite and a Y zeolite.

6. The process of claim 1 wherein said cracking conditions include a temperature of about 250°–600° C., a catalyst/hydrocarbon weight ratio of about 3–10, a pressure of about 1 bar to about 5 bars and a weight space velocity of about 5–50 per hour.

7. The process of claim 1 wherein said cracking system comprises a catalytic cracker, a catalyst stripping zone and a regenerator wherein said cracking catalyst and said CO oxidation promoter circulate between said cracker, stripper and regenerator.

8. The process of claim 1 wherein said oxygen-containing gas is air or relatively pure oxygen.

9. The process of claim 1 wherein said three times the minimum amount of oxidation promoter acts to reduce the quantity of $NH_3$ present in an off-gas from the regenerator.

10. The process of claim 9 wherein said off-gas from said regenerator is passed to a combustion zone for the combustion of CO to $CO_2$ in the presence of oxygen and wherein said CO combustion produces a gaseous effluent containing a reduced quantity of $NH_3$ when compared to a CO combustion zone receiving a regenerator off-gas generated without the presence of at least three times the minimum quantity of said CO promoter.

11. In a process for reducing $NO_x$ emission during a process for the cracking of hydrocarbons and catalyst regeneration comprising a cracking catalyst inventory of circulating solid particles including a CO oxidation promoter, wherein said catalyst inventory and said CO oxidation promoter are recycled between a hydrocarbon cracking zone and a catalyst regeneration zone operated in a partial oxidation combustion mode defined by a temperature of 1050° F. to about 1300° F. and a CO content by volume of greater than 1 percent, wherein regeneration off-gas is formed by burning coke off said catalyst inventory, in the presence of a molecular oxygen-containing gas, at regeneration conditions, in said regeneration zone and where during said coke-burning, carbon monoxide, carbon dioxide and ammonia ($NH_3$) are formed, the improvement which consists of reducing the presence of ammonia ($NH_3$) by incorporating at least two times the minimum amount by weight of oxidation promoter than sufficient to prevent afterburn combustion in the dilute phase of the regenerator.

12. The process of claim 11 wherein said CO oxidation promoter is selected from the group consisting of platinum compounds, platinum metal, palladium compound and palladium metal which is deposited on an inorganic oxide support selected from the group consisting of alumina, silica, magnesia and combinations thereof.

13. The process of claim 11 wherein said gas formed by said coke-burning having a reduced quantity of ammonia ($NH_3$) is passed to a CO combustion zone wherein, during the combustion of CO to $CO_2$, $NH_3$ is converted to $NO_x$.

14. The process of claim 13 wherein a reduced amount of $NO_x$ is formed as a result of the presence of at least three times the minimum amount of CO oxidation promoter added to the regeneration zone.

15. The process of claim 11 wherein said molecular oxygen-containing gas comprises air or relatively pure oxygen.

16. The process of claim 11 wherein the CO content by volume in the regeneration zone is equal to greater than 1 percent to about 10 percent.

17. The process of claim 11 wherein said catalyst inventory circulates between said hydrocarbon cracking and said regeneration zone and wherein said catalyst inventory is stripped, in the presence of steam, to remove hydrocarbons from said catalyst inventory.

18. A process to reduce the content of ammonia ($NH_3$) in a fluid catalytic cracking regeneration zone off-gas derived from a fluid catalytic cracking regeneration zone operated in an incomplete mode of combustion defined by a CO content of greater than 1% by volume, which process comprises adding a CO oxidation promoter in a content of greater than two times the minimum amount of CO oxidation promoter sufficient to prevent afterburn in the dilute phase of the regenerator.

19. The process of claim 18 wherein said CO oxidation promoter is present in an amount greater than three times the minimum amount of CO oxidation promoter sufficient to prevent afterburn in the dilute phase of the regenerator.

* * * * *